United States Patent
Seo et al.

(10) Patent No.: US 7,430,267 B2
(45) Date of Patent: Sep. 30, 2008

(54) MULTI-CORE FUEL ROD FOR RESEARCH REACTOR AND MANUFACTURING METHOD THEREOF

(75) Inventors: Chul Gyo Seo, Daejeon-si (KR); Ho Jin Ryu, Daejeon-si (KR); Chang Kyu Kim, Daejeon-si (KR); Yoon Sang Lee, Daejeon-si (KR); Jong Man Park, Daejeon-si (KR); Don Bae Lee, Daejeon-si (KR); Seok Jin Oh, Daejeon-si (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 50 days.

(21) Appl. No.: 11/091,071

(22) Filed: Mar. 28, 2005

(65) Prior Publication Data

US 2006/0193426 A1   Aug. 31, 2006

(30) Foreign Application Priority Data

Feb. 16, 2005   (KR)   ............... 10-2005-0012811

(51) Int. Cl.
    *G21C 3/30* (2006.01)
(52) U.S. Cl. .................. 376/426; 376/412; 376/428
(58) Field of Classification Search .............. 376/426, 376/412, 428
    See application file for complete search history.

(56) References Cited

U.S. PATENT DOCUMENTS

| | | | | |
|---|---|---|---|---|
| 3,109,797 A | * | 11/1963 | Maxwell | 376/435 |
| 3,573,168 A | * | 3/1971 | Grossman et al. | 376/418 |
| 4,720,370 A | * | 1/1988 | Travelli | 376/422 |
| 4,963,317 A | * | 10/1990 | Wiencek et al. | 376/422 |
| 5,068,082 A | * | 11/1991 | Ueda et al. | 376/428 |
| 5,198,186 A | * | 3/1993 | Ogiya et al. | 376/435 |
| 5,991,354 A | * | 11/1999 | Van Swam | 376/428 |
| 2003/0223530 A1 | * | 12/2003 | Mol et al. | 376/422 |

OTHER PUBLICATIONS

Lee et al., "A Study of Hanaro Core Conversion Using High Density U-Mo Fuel," 2002 International Meeting of Reduced Enrichment for Research and Test Reactors, Bariloche, Argentina, Nov. 3-8, 2002.*

(Continued)

*Primary Examiner*—Rick Palabrica
(74) *Attorney, Agent, or Firm*—Bachman & LaPointe, P.C.

(57) ABSTRACT

The present invention relates to a multi-core fuel rod for research reactor and, more particularly, to a multi-core fuel rod for research reactor in which monolithic fuel cores made of uranium-molybdenum alloy are disposed in an aluminum matrix in a multi-core form. The multi-core fuel rod in accordance with the present invention provides a minimized contact surface area between nuclear fuel and aluminum, and reduces the formation of pores and swelling by restraining formation of reaction layer to avoid excessive reaction between the fuel and aluminum. Therefore, improved stability of nuclear fuel can be obtained by minimizing temperature rise as well as achieving high density and thermal conductivity of the fuel.

3 Claims, 11 Drawing Sheets

OTHER PUBLICATIONS

Glaser, "Monolithic Fuel and High Flux Reactor Conversion", 26the International Meeting on Reduced Enrichment for Research and Test Reactors (RERTR). Nov. 7-12, 2004, Vienna, Austria.*

Research Reactors, UIC Nuclear Issues Briefing Paper #66, Dec. 2004.*

Vatulin et al., "Radiation Resistance of High-Density Uranium-Molybdenum Dispersion Fuel for Nuclear Research Reactors," Atomnaya Energiya, vol. 100, No. 1, pp. 37-46, Jan. 2005.*

Abramov et al., "Bilibino Nuclear Power Station," Atomnaya Energiya, vol. 35, No. 5, pp. 299-304, Nov. 1973.*

UIC Nuclear Issues Briefing Paper #66, Dec. 2004.*

Hofman, "A Short Note on High Density Dispersion Fuel", Jun. 1996.*

Clark et al., "Development of a Monolithic Research Reactor Fuel Type at Argonne National Laboratory," Oct. 6, 2004.*

C.R. Clack et al., "Update on U-Mo Monolithic and Dispersion Fuel Development," Int'l. Conf. Research Reactor Fuel Management (RRFM'04), Munich, Germany, Mar. 21-24, 2004.

C.G. Seo et al., "Reactor Physics Analysis for High Core Conversion Using High Density U-Mo Fuel," Proc. Korea Nuclear Society, Kyung-ju, Korea, May 2004.

C. G. Seo et al., "A New Fuel Concept for the Hanaro Research Center," Proceedings of the Korean Nuclear Society Autumn Meeting, Yongpyong, Korea, Oct. 2004, 1065-1066.

* cited by examiner

MULTI-CORE FUEL ROD FOR RESEARCH REACTOR AND MANUFACTURING METHOD THEREOF

BACKGROUND OF THE INVENTION

1. Field of the Invention

The present invention relates to a multi-core fuel rod for research reactor and a manufacturing method thereof and, more particularly, to a multi-core fuel rod for research reactor in which monolithic fuel cores made of uranium-molybdenum alloy are disposed in an aluminum (Al) matrix in the form of multi-core, and a manufacturing method thereof.

2. Description of the Prior Art

A large amount of radiations and heat are generated when uranium undergoes nuclear fission. A power reactor utilizes heat generated from the nuclear fission and a research reactor utilizes radiations generated from the nuclear fission. A nuclear fuel is a material used for the nuclear fission. Generally, the research reactor has used highly enriched uranium alloy with uranium content above 90% as a nuclear fuel to obtain high neutron flux for an effective research. However the highly enriched uranium may increase a danger of nuclear proliferation, and thereby low enriched uranium alloy as a nuclear fuel has been developed since 1978 to replace the highly enriched uranium under the leading role of the United States. The main purpose of the development is to solve the problem by lowering the enrichment through the development of high-density nuclear fuel enabling high loading of uranium.

Metal matrix dispersion fuel has been developed by dispersing uranium silicide ($U_3Si$ or $U_3Si_2$) in an Al matrix. The uranium silicide is a uranium alloy, which has relatively high uranium density and excellent stability in nuclear irradiation. The dispersion fuel is manufactured with fuel material of a uranium alloy type in a powder form mixed with heat carrier such as aluminum having high thermal conductivity, which keeps the fuel rod at low temperature. Since the late 1980's, highly enriched $UAl_x$ fuel has been replaced with low enriched fuel of uranium silicide, and the dispersion fuel using $U_3Si_2$ dispersed in Al matrix, as a nuclear fuel, has enabled successful development of a new research reactor which is allowed to increase fuel loading up to 4.8 gU/cc.

A high performance research reactor requires high-density fuel, and researches for the high performance fuel had been carried out continuously. However researchers faced the problems that high-density fuel could not be manufactured satisfactorily and fuel reprocessing was not easy. Accordingly, another research was started to survey a material having higher density of uranium than uranium silicide fuel and enabling easier reprocessing. Since the late 1990's, U-Mo alloy fuel has been intensively developed among various applicable fuel materials, because the U-Mo alloy fuel can be manufactured in high density and has excellent stability in the nuclear reactor.

A stepwise irradiation test has been carried out to evaluate the performance of U-Mo fuel. A good result is obtained when the irradiation test is performed in a low power operation, however a problem of fuel damages arises when the irradiation test is performed in a high power operation. In the case of high power operation, the temperature of fuel goes up high by a rapidly increased reaction between aluminum and uranium, and pores and intermetallic compound of $UAl_x$ are formed. The pores and low-density $UAl_x$ increase the volume of fuel, and cause swelling of fuel. The pores and $UAl_x$ having lower thermal conductivity further accelerate the temperature rise and swelling of fuel. Excessive swelling of fuel directly causes fuel damages. The reaction between aluminum and uranium is accelerated as the reaction surface area is being increased. FIG. 1 is a photo of U-Mo dispersion fuel taken after irradiation test, which shows U-Mo fuel particles, $UAl_x$ reaction layers, and aluminum matrix. Regardless of the fuel particle size, the thickness of each $UAl_x$ layer is almost identical, and the volume of $UAl_x$ is increasing as the reaction surface area is increasing. Therefore the reaction surface area should be reduced, because the increase of $UAl_x$ causes high temperature and swelling of fuel.

Generally, monolithic fuel is more interested than a dispersion fuel, because the monolithic fuel has a smaller reaction surface area than the dispersion fuel. Nuclear fuel for research reactor may be classified into plate type and rod type, and an irradiation test for U-Mo monolithic fuel of the plate type has been carried out by U.S. ANL with a good result. Development of rod type monolithic fuel is proceeding in Korea, and the monolithic fuel rods of ring or tube type have been suggested. The above fuel has a disadvantage that reaction surface temperature is high in the case of increased uranium loading. The fuel has an advantage that uranium content can be controlled due to discontinuity in the longitudinal direction, however the fuel has a difficulty in manufacturing.

A multi-core fuel rod for research reactor in accordance with the present invention has been developed by locating monolithic fuel with uranium-molybdenum alloy into a fuel rod in a multi-core form, in order to overcome the disadvantages in the conventional fuel rod. The present invention provides high stability of nuclear fuel by significantly reducing the formation of intermetallic compound between uranium alloy and aluminum metal.

SUMMARY OF THE INVENTION

An object of the present invention is to provide a multi-core fuel rod for research reactor with high stability by significantly reducing the formation of intermetallic compound between uranium compound and aluminum, which causes performance drop of nuclear fuel. The formation of intermetallic compound may be reduced by minimizing the reaction surface area between uranium compound fuel and aluminum, and lowering the surface temperature.

In order to achieve the above object, the present invention provides a multi-core fuel rod for research reactor by disposing monolithic fuel cores made of uranium-molybdenum alloy in an aluminum matrix in a multi-core form.

Additionally, the present invention provides a manufacturing method of cylindrical monolithic fuel core by melting U-Mo alloy, and injecting the molten U-Mo alloy into a quartz tube having a specific diameter in a vacuum state.

Further, the present invention provides a manufacturing method of multi-core fuel rod for research reactor having the monolithic fuel cores loaded in Al matrix in a multi-core form, and Al cladding surrounding the circumference of the Al matrix.

DETAILED DESCRIPTION OF THE PREFERRED EMBODIMENTS

Hereinafter, the present invention will be described in more detail.

Figure 4:
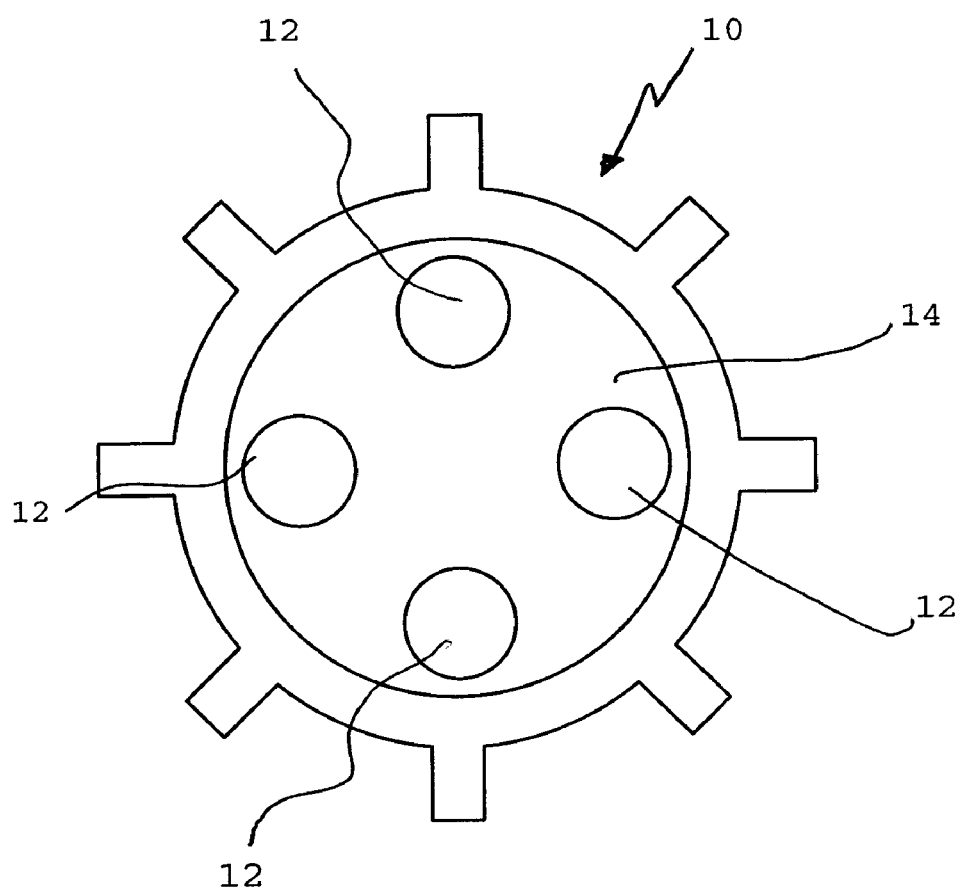
FIG. 4 is a cross-sectional view of monolithic fuel rod having 4 fuel cores in accordance with an example embodiment of the present invention.
Figure 5A:
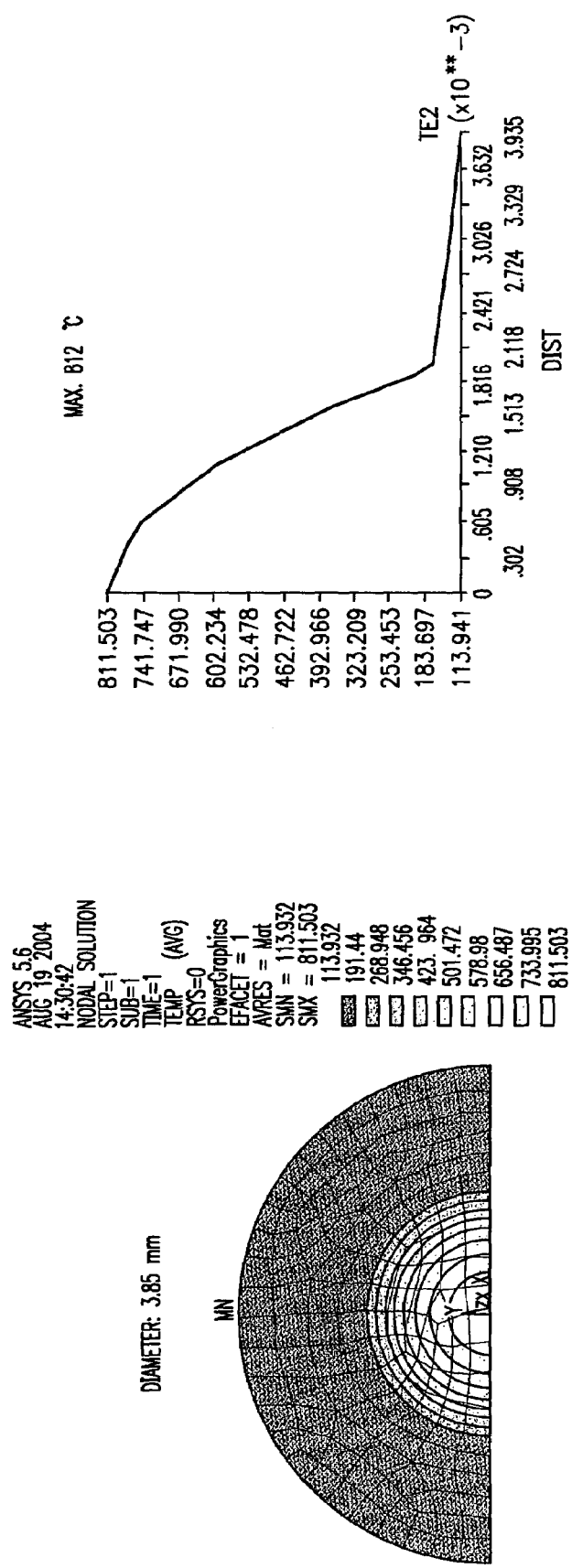
FIG. 5 is a graph showing an ANSYS model of temperature distribution analysis of fuel rod having 1-6 fuel cores in accordance with an example embodiment of the present invention and the comparison example.
Figure 5B:
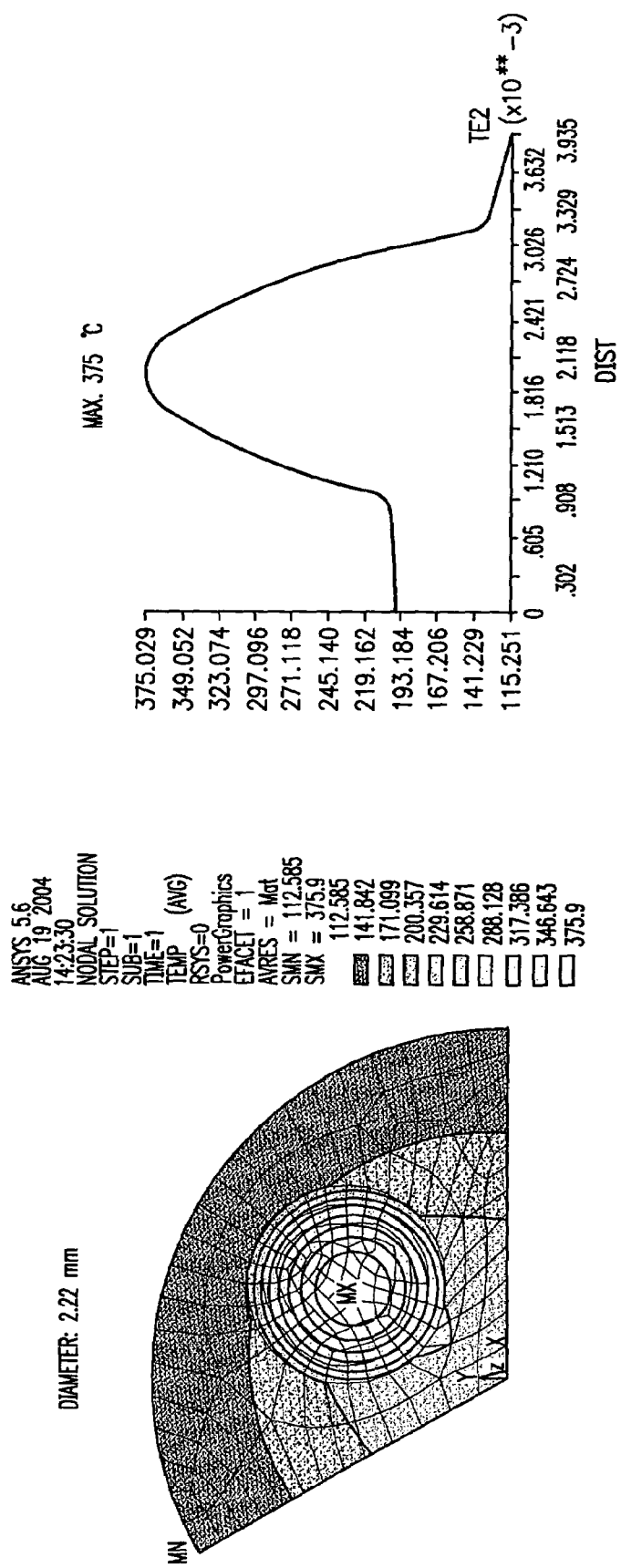
Figure 5C:
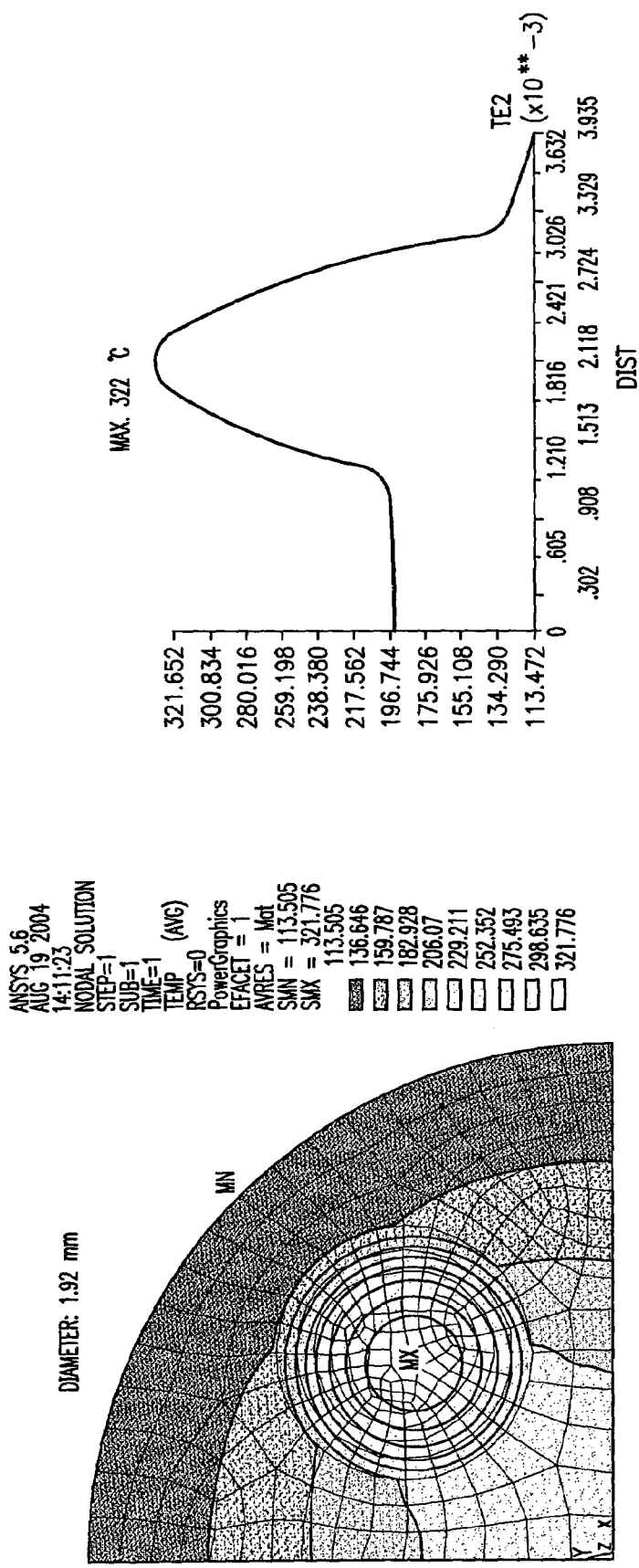
Figure 5D:
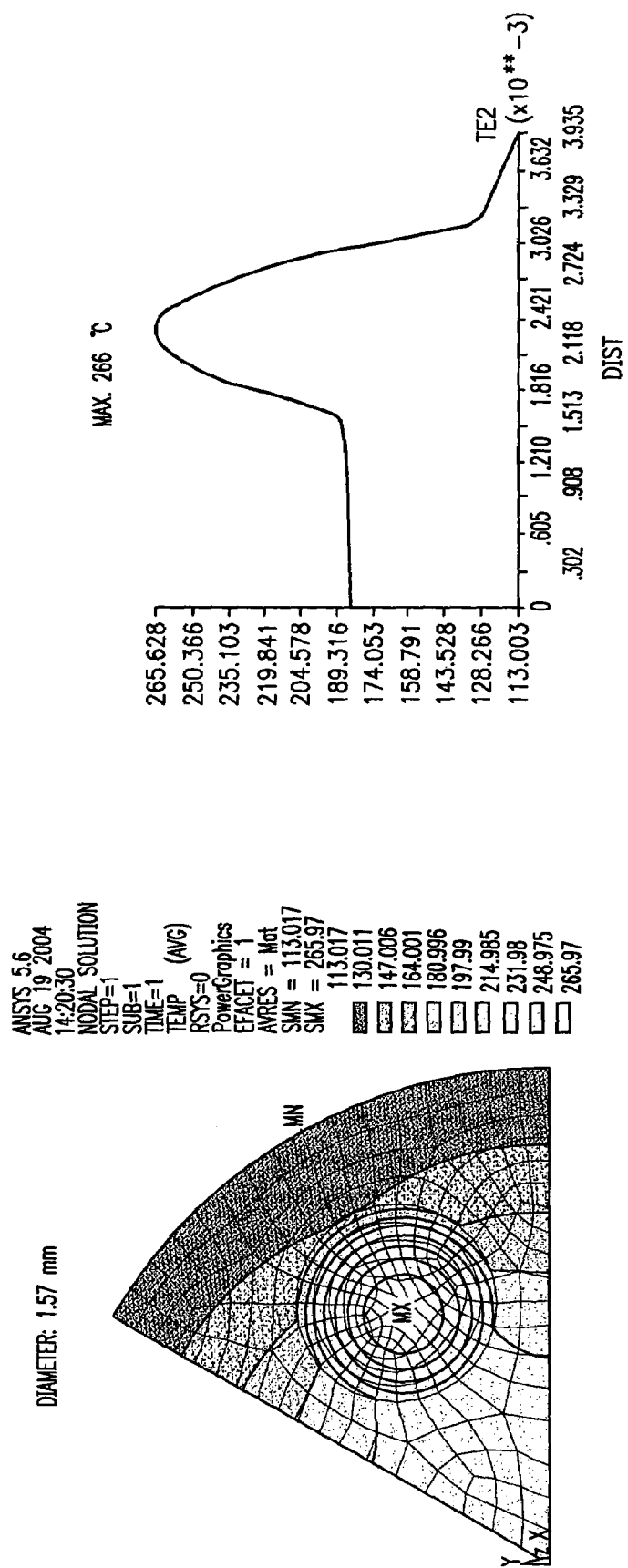

The present invention, an embodiment of which is shown in FIG. 4, relates to a multi-core fuel rod 10 for research reactor.

Monolithic fuel cores 12 with a specific diameter are loaded into an Al matrix 14 in a multi-core form, along the positions located at the same distance from the center of Al matrix 14. An Al cladding 16 surrounds the circumference of the Al matrix 14. A multi-core fuel rod 10 is a fuel rod including a plurality of fuel cores 12. The aluminum matrix 14 surrounds the fuel cores 12 and acts as a heat carrier transferring heat effectively. Heat generated from each fuel core 12 is transferred to the heat carrier having high thermal conductivity and easily dissipated to the outside of the fuel rod. Accordingly, the aluminum enables a fuel rod to maintain fuel cores at low surface temperature.

In the multi-core fuel rod for research reactor in accordance with the present invention, geometric form of fuel core is cylindrical as that of fuel rod. The number of cylindrical fuel cores is preferably controlled in the range of 2-10 and, more preferably in the range of 3-6. The diameter of fuel core is preferably controlled in the range of 1.0-3.0 mm according to the number of loaded fuel cores.

In the case that the number of fuel cores is less than two or the diameter of fuel core is larger than 3.0 mm, it is not suitable for fuel rod because the maximum temperature of fuel core is increased. In the case that the number of fuel cores exceeds 10, it is undesirable because the structure of fuel rod becomes similar to a ring type, which is not helpful for improvement of thermal conductivity. Additionally, in the case of the diameter of fuel core is less than 1.0 mm, it is undesirable because an effect of utilizing multiple fuel cores may not be obtained.

In the multi-core fuel rod for research reactor in accordance with the present invention, the monolithic fuel core may be pure uranium free from molybdenum. The fuel core having uranium density higher than 10 gU/cc may be applicable to the fuel for high-performance research reactor, which requires high uranium density.

It is important to avoid formation of intermetallic reaction layer having low-density $UAl_x$, when increasing the uranium density. The intermetallic reaction layer having low thermal conductivity decreases the heat transfer between fuel particles and Al matrix, and thereby causes a high temperature in the center of fuel particle as the burnup is proceeding. Additionally, a serious problem influencing the stability and performance of the fuel is caused by low-density reaction layer, which expands the volume of fuel core material and results in damages of cladding. The present invention solves the above problems by inserting fuel cores into Al matrix in a multi-core form, which reduces the reaction surface area significantly.

In the multi-core fuel rod for research reactor in accordance with the present invention, the alloy fuel contains uranium and molybdenum in a specific ratio, where the molybdenum is added to the alloy fuel for the gamma-phase stability of uranium in the fuel core, preferably with the content of 6-10 wt % (weight percent).

In the case that the molybdenum content is lower than 6 wt %, it is undesirable because gamma-phase stability of uranium is declined. In the case that the molybdenum content is higher than 10 wt %, it is also undesirable because relative content of uranium is decreased.

In the conventional aluminum matrix of ring or tube form, and a U-Mo dispersion fuel, $UAl_2$ and $UAl_3$ formed by irradiation in the reactor further form $UAl_4$ by a reaction with Al, generating heat. The reaction of $UAl_2$ is faster than that of $UAl_3$ and generates more heat. The reaction is accelerated according to the temperature rise, and increased sharply at the temperature above 525° C., resulting in formation of low-density $UAl_x$ reaction layers. Pores and low-density $UAl_x$ formed during the reaction increase the volume of fuel, causing swelling of the fuel and low thermal conductivity. According to the present invention, a plurality of fuel cores are disposed in a multi-core form at the same distances from the center of Al matrix, and significantly reduces the reaction surface area between U-Mo alloy and Al. Therefore, the present invention avoids the disadvantages due to formation of $UAl_x$ layer in the prior art, by substantially restraining the formation of intermetallic compound between uranium alloy and aluminum, which causes performance drop of nuclear fuel.

Additionally, the present invention provides a manufacturing method of cylindrical monolithic fuel core loaded into an Al matrix.

Although the manufacturing method of monolithic fuel core for research reactor may adopt various processes and are not specifically limited as long as a cylindrical alloy is manufactured by mixing uranium and molybdenum in a specific ratio, the fuel core may preferably be manufactured by a casting process.

Firstly, an U-Mo alloy is melted in a furnace, and then an open-end of hollow quartz tube is immersed into the furnace in a vacuum state. Subsequently, the casting apparatus is exposed to the atmosphere and the molten U-Mo alloy is easily sucked into the quartz tube by a pressure difference between the inside of quartz tube and the surrounding atmosphere. Degree of vacuum in the quartz, tube is preferably maintained in the range of $2 \times 10^{-2}$-$6 \times 10^{-2}$ torr. If the degree of vacuum is lower than the above range, the molten U-Mo alloy is not easily filled into the quartz tube. Alternatively, if the degree of vacuum is higher than the above range, a closed end of the quartz tube may break away. After filling and solidifying, the quartz tube with the molten alloy, the manufacturing process of cylindrical monolithic fuel core in accordance with the present invention is completed with breaking off the quartz tube only.

Furthermore, a multi-core fuel rod for research reactor in accordance with the present invention may be manufactured by the following method.

The fuel rod in accordance with the present invention may be manufactured through the steps comprising: forming circular holes inside the circumference of aluminum (Al) matrix, where a plurality of fuel cores will be located; inserting a plurality of fuel cores into the holes; casting the Al matrix by pilgering; cladding the circumference of the resultant product with Al.

Core material of fuel rod comprises a rod-type Al alloy having a specific strength and cylindrical U-Mo fuel cores, and 2-10 holes are formed inside the circumference of rod-type Al so that cylindrical U-Mo fuel cores may be disposed in a multi-core form. Monolithic fuel cores manufactured in accordance with the present invention are inserted into the holes, and Al heat carrier is cast by pilgering to surround the fuel cores. Subsequently, both ends of the fuel rod is assembled with sealing plugs, and then extruded with Al in the form of concentric cladding. Both ends of the extruded fuel rod are processed so that the fuel rod can be assembled with end plates. The multi-core fuel rod for research reactor is obtained by processing the gaps between fuel rod cladding and Al sealing plugs with electron beam welding, after the sealing process.

Hereinafter, a more detailed description will follow referring to the accompanying drawings for easier understanding of the present invention.

Figure 1:
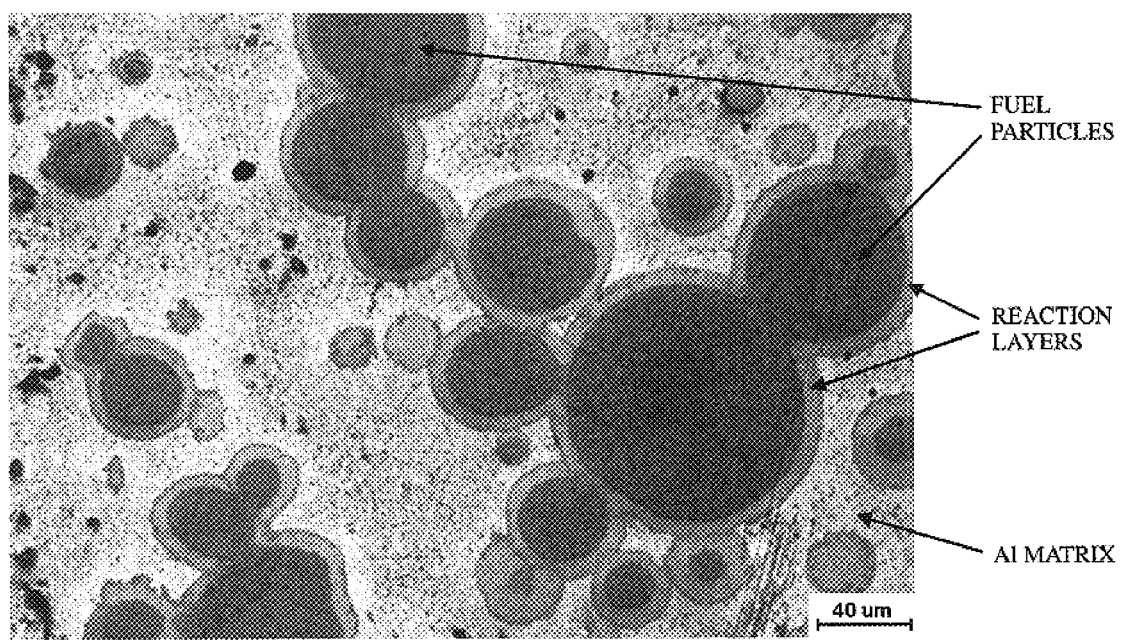
FIG. 1 is a photo of uranium-molybdenum alloy taken after irradiation test of dispersion fuel in accordance with a comparison example.

FIG. 1 is a photo of uranium-molybdenum alloy taken after irradiation test of dispersion fuel in accordance with a comparison example. In the dispersion fuel, it is well shown that fuel particles of uranium alloy are dispersed in aluminum matrix and reaction layers are formed on the surface of fuel particles. The thickness of each reaction layer is almost same regardless of the fuel particle size. The reaction rate is increased as the temperature rises, and suddenly increased at the temperature above 525° C., and excessive intermetallic compound is formed, causing cracks due to the expansion of volume. The intermetallic compound has low thermal conductivity, and decreases the heat transfer between fuel particles and Al matrix, which causes the temperature rise in fuel particle center higher and higher as the burnup is proceeding. Additionally, there is a serious problem that the reaction layer having a low density gives a great influence to the stability and performance of fuel by destroying a cladding material, because the reaction layer increases the volume of fuel core.

Figure 2:
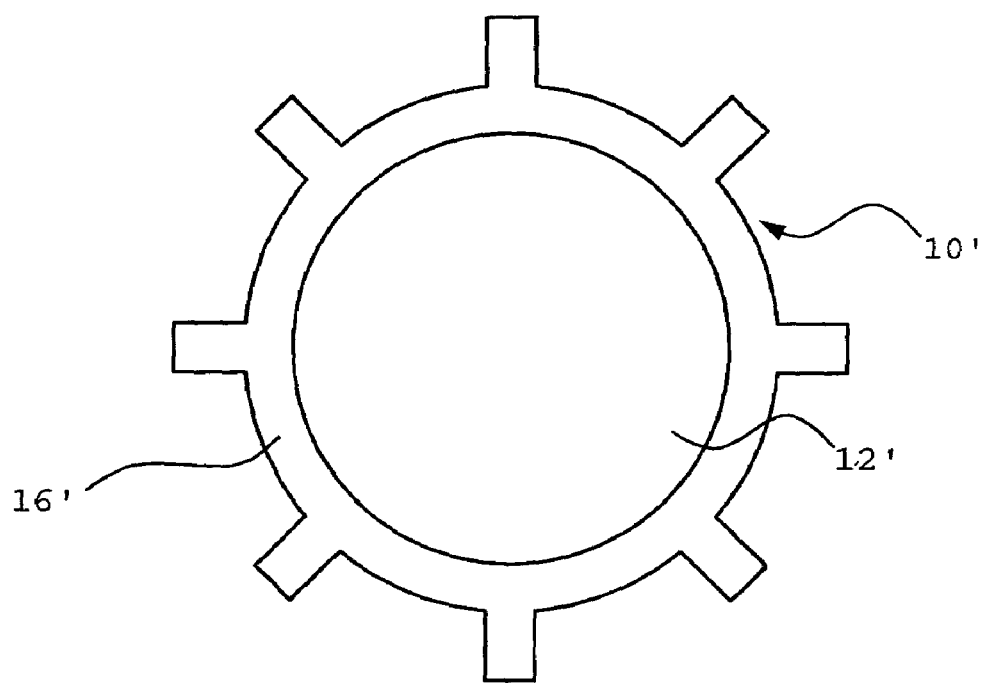
FIG. 2 is a cross-sectional view of fuel rod 10' formed of fuel core 12' and cladding 16' in the prior art.

FIG. 2 is a cross-sectional view of fuel rod 10' Formed of fuel core 12' and cladding 16' in the prior art. The fuel core is a fuel material of uranium alloy comprising dispersion fuel mixed with aluminum matrix. FIG. 2 shows a cross-section of fuel rod having dispersion fuel 2 shows a cross-section of fuel rod having dispersion fuel mixed with aluminum matrix and fuel particles of conventional type.

Figure 3:
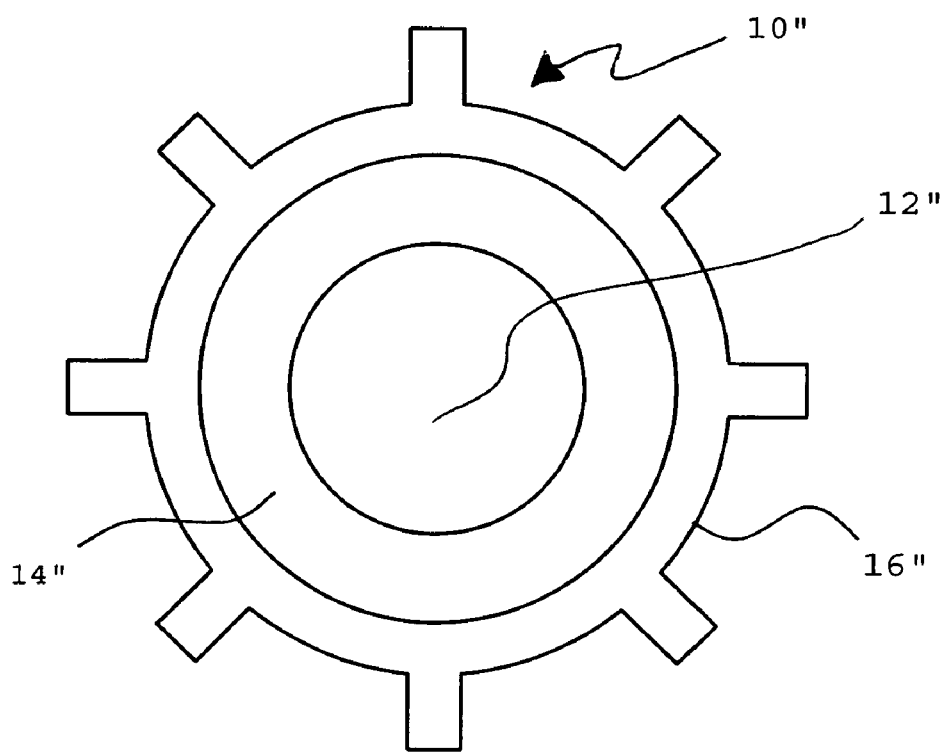
FIG. 3 is a cross-sectional view of monolithic fuel rod having a fuel core in accordance with a comparison example.

FIG. 3 is a cross-sectional view of monolithic fuel rod 10'' having a fuel core 12 in accordance with a comparison example. As shown in FIG. 5, the maximum temperature of monolithic fuel core having a fuel core is 812° C. and the surface temperature of the fuel core is 177° C. The monolithic fuel has lower reaction surface temperature than dispersion fuel, however the maximum temperature is 812° C., higher than 600° C., and has low irradiation stability. Therefore, there is a problem that the maximum temperature of the monolithic fuel has to be lowered.

FIG. 4 is a cross-sectional view of monolithic fuel rod 10 having 4 fuel cores 12 in accordance with an example embodiment of the present invention. The multi-core fuel rod for research reactor shown in FIG. 4 is manufactured by the same process as the fuel rods shown in FIG. 8. As shown in FIG. 5, the maximum temperature of 4 fuel cores is 322° C. and the maximum surface temperature is 195° C., indicating that the fuel rod is suitable for research reactor.

FIG. 5 is a graph showing an ANSYS model of temperature distribution analysis of fuel rod having 1-6 fuel cores in accordance with an example embodiment of the present invention. As the number of fuel cores increases, the maximum temperatures of fuel core and reaction surface decrease, indicating that the fuel rod is suitable for research reactor.

Figure 6:
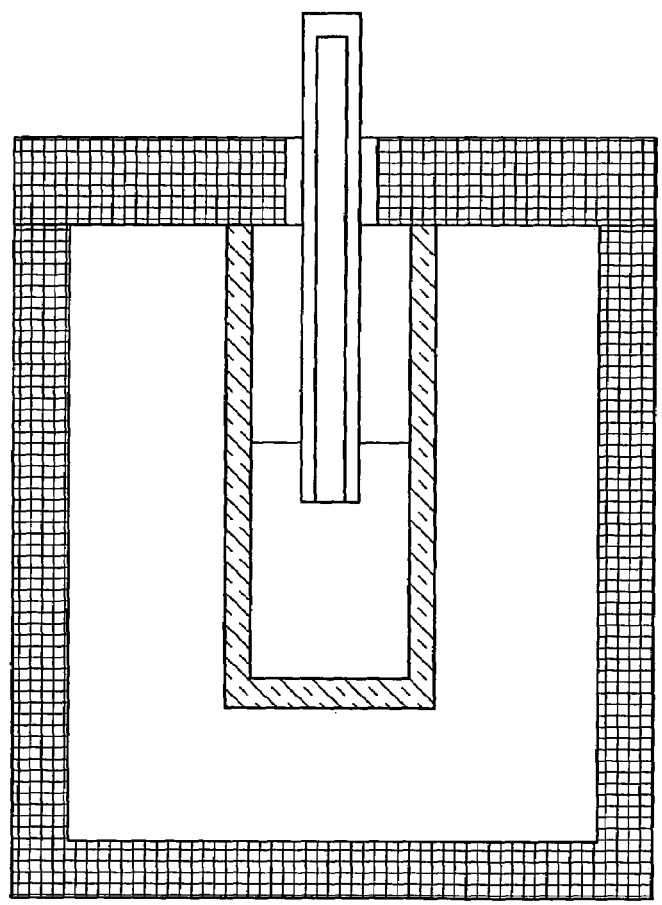
FIG. 6 is a schematic view of casting apparatus to manufacture a fuel core in accordance with an example embodiment of the present invention.

FIG. 6 is a schematic view of casting apparatus to manufacture a fuel core in accordance with an example embodiment of the present invention.

Figure 7:
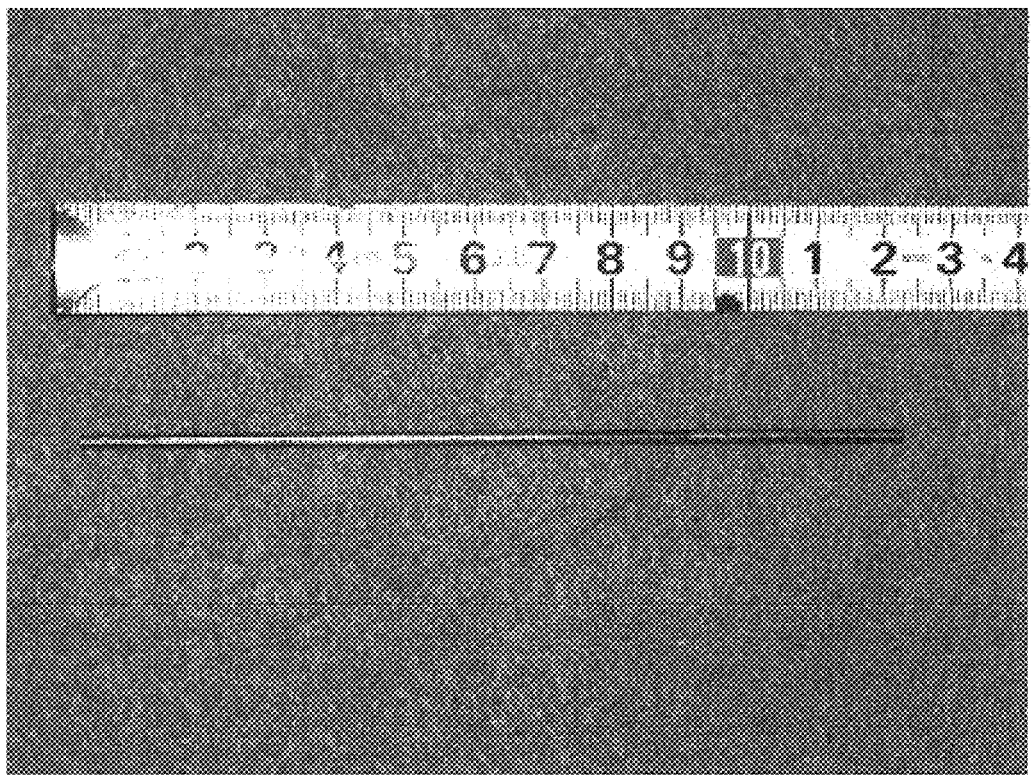
FIG. 7 is a photo of fuel core with the diameter of 2 mm and length of 120 mm manufactured in accordance with the example embodiment of the present invention.

FIG. 7 is a photo of fuel core with the diameter of 2 mm and length of 120 mm manufactured by a casting apparatus of FIG. 6, in accordance with another example embodiment of the present invention.

Figure 8:
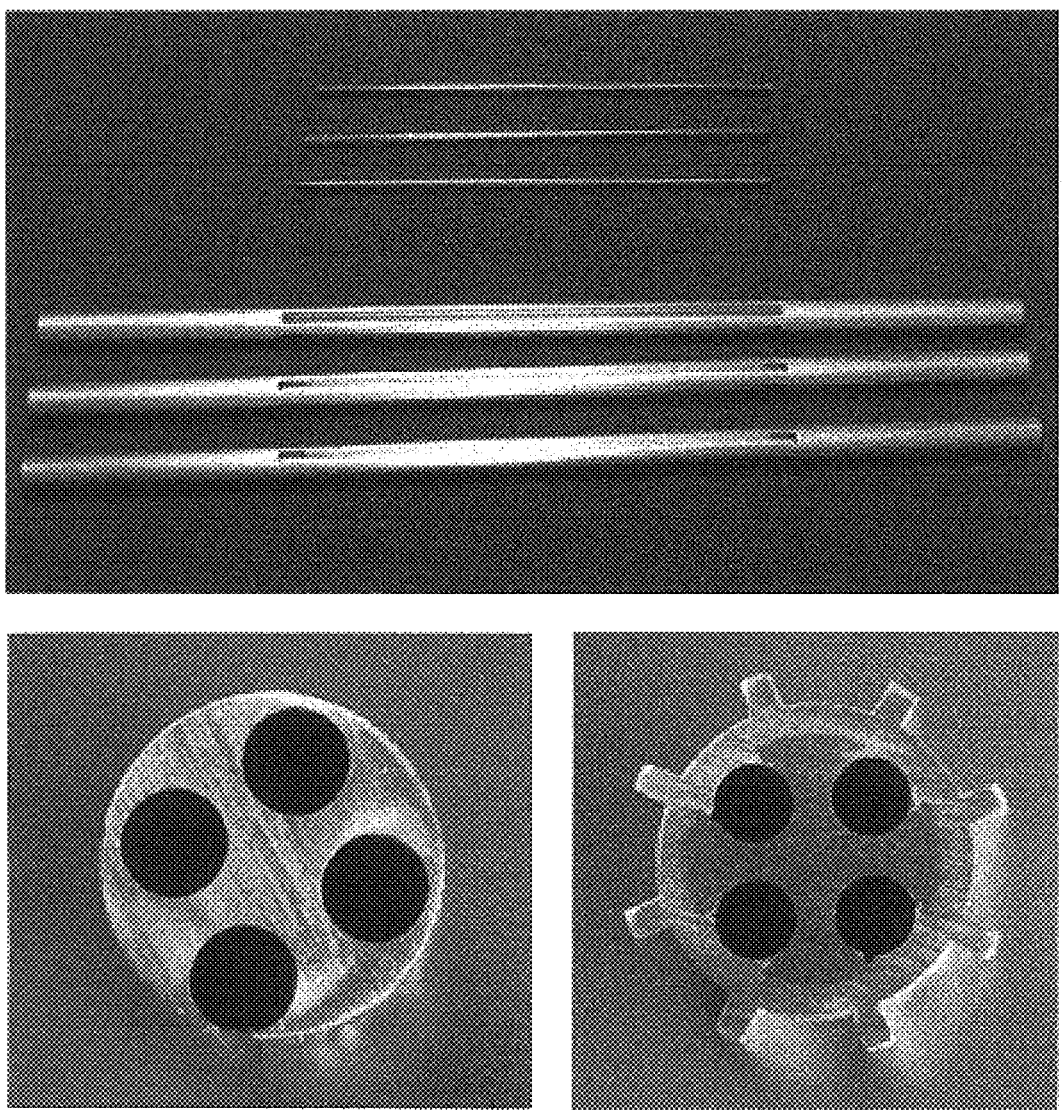
FIG. 8 shows photos of multi-core U-Mo fuel rods in a manufacturing process in accordance with example embodiments of the present invention.

FIG. 8 shows photos of multi-core U-Mo fuel rods in a manufacturing process in accordance with example embodiments of the present invention. The upper photo in FIG. 8 shows the fuel cores and Al heat carrier having holes to accommodate the fuel cores. The lower left photo shows the cross-section of aluminum heat carrier processed according to the size of fuel core. The lower right photo shows the cross-section of fuel rod with Al cladding according to a conventional extrusion process.

Hereinafter, the present invention will be described in more detail by illustrating example embodiments of the invention are illustrated. It will be appreciated that the invention may be embodied in many different forms and should not be construed as limited to the particular embodiments set forth herein.

EXAMPLE 1

Manufacturing of Multi-Core Fuel Rod for Research Reactor in Accordance with the Present Invention (1) Manufacturing of Cylindrical Monolithic Fuel Rod U-Mo alloy is melted in a furnace at the initial temperature of 1400° C. in the vacuum condition of $4 \times 10^{-2}$ torr to manufacture a cylindrical monolithic fuel core. In the vacuum state, an open end of quartz tube, of which the other end is closed, is immersed into the furnace, and then the quartz tube is filled with liquid U-Mo by releasing the vacuum to the atmosphere. Subsequently, a cylindrical fuel core having diameter of 2 mm and length of 120 mm is obtained by breaking off the quartz tube filled with U-Mo after solidification.

(2) Manufacturing of Multi-Core Fuel Rod

Al carrier is manufactured by forming 4 holes in rod material of Al1060, in which the fuel cores will be located, according to the size of fuel core manufactured by the above method. The fuel cores are inserted into the Al carrier and then assembled by casting the Al carrier with a pilgering method. Subsequently, the Al carrier is covered with concentric Al cladding by extrusion.

EXAMPLE 2

Manufacturing of Multi-Core Fuel Rod for Research Reactor in Accordance with the Present Invention A multi-core fuel rod for research reactor is manufactured with the same method as Example 1, except that the Al carrier is manufactured to accommodate 4 fuel cores.

EXAMPLE 3

Manufacturing of Multi-Core Fuel Rod for Research Reactor in Accordance with the Present Invention A multi-core fuel rod for research reactor is manufactured with the same method as Example 1, except that the Al carrier is manufactured to accommodate 6 fuel cores.

COMPARISON EXAMPLE 1

Comparison to Dispersion Fuel

A type of conventional U-Mo fuel particles dispersed in Al matrix is shown in FIG. 2.

COMPARISON EXAMPLE 2

Comparison to Monolithic Fuel Rod

A monolithic fuel rod 10" having a fuel core 12" in the center of Al matrix 14" is shown in FIG. 3.

EXPERIMENT 1

Comparison Test of Reaction Surface Area

Under the condition of 7 wt % Mo in U-Mo fuel, the reaction surface areas of dispersion fuel of comparison example 1 are compared to those of monolithic fuel in accordance with the example embodiment of the present invention, of which diameter is controlled to have the same density as the dispersion fuel. The diameter of dispersion fuel particle is 50 or 100 μm and the monolithic fuel is a fuel rod having 1 or 4 fuel cores. The uranium density of dispersion fuel is 6 gU/cc and the diameter of fuel rod is 6.35 mm. The diameter of monolithic fuel having the same uranium density as the dispersion fuel having the particle diameter 50 or 100 μm corresponds to 1.93 or 3.85 mm respectively. Each reaction surface area is calculated and comparative ratios are listed in Table 1, based on the reaction surface area of dispersion fuel having a particle size of 50 μm.

TABLE 1

| | | | Comparison factor | |
|---|---|---|---|---|
| Fuel | Diameter | Numbers | Reaction surface area (cm$^2$) | Comparative ratio |
| Dispersion fuel | 50 μm | 5,620,677 | 1393.0 | 1.0 |
| | 100 μm | 702,585 | 697.0 | 0.5 |
| Monolithic fuel | 1.93 mm | 4 | 2.42 | 0.0017 |
| | 3.85 mm | 1 | 1.21 | 0.0009 |

The monolithic fuel having 4 fuel cores has only 1/576 times of the reaction surface area compared to the dispersion fuel having 50 μm fuel particles. Swelling of the monolithic fuel is only 1/576 times compared to the dispersion fuel, under the condition that the reaction layers have the same thickness.

EXPERIMENT 2

Test of Temperature Distribution and Performance Prediction of Fuel Rod in Accordance with the Present Invention Temperature distribution of the monolithic fuel has been calculated with regard to the number of fuel cores. ANSYS code is utilized to calculate the temperature distribution. As shown in FIG. 5, four models of temperature calculation have been established. The temperature of nuclear fuel has a close relationship with linear power (power per unit length). Under the same condition of linear power 120 kW/m, the temperature distribution of monolithic fuel rod having a plurality of fuel cores have been compared to that of dispersion fuel.

(1) Temperature Distribution of Dispersion Fuel

The maximum reaction surface temperature of dispersion fuel in accordance with Comparison Example 1 is 214° C.

(2) Temperature Distribution of Fuel Rod having a Fuel Core

The maximum temperature of monolithic fuel having a fuel core is 812° C., and the reaction surface temperature of fuel core is 177° C., in accordance with Comparison Example 2.

As described above, it is well shown that the monolithic fuel has a lower reaction surface temperature than the dispersion fuel. The uranium-molybdenum alloy has high irradiation stability below 600° C., however the maximum temperature of monolithic fuel having a fuel core is too high. There is therefore a subject that the temperature has to be lowered.

(3) Temperature Distribution of Fuel Rod having 3 Fuel Cores

The maximum temperature of monolithic fuel having 3 fuel cores in accordance with Example 1 of the present invention is 375° C.

As described above, it is clearly shown that the maximum temperature of fuel is 375° C. and this type is suitable for fuel rod.

(4) Temperature Distribution of Fuel Rod having 4 Fuel Cores

The maximum temperature of monolithic fuel having 4 fuel cores is 322° C., and the reaction surface temperature of fuel core is 195° C., in accordance with Example 2 of the present invention.

As described above, the maximum surface temperature of fuel rod is lower than 214° C., that of dispersion fuel, indicating that the reaction of U-Mo fuel with Al can be reduced. It is well shown that the maximum temperature of fuel is 195° C. and this type is also suitable for fuel rod.

(5) Temperature Distribution of Fuel Rod having 6 Fuel Cores

The maximum temperature of monolithic fuel having 6 fuel cores is 266° C., in accordance with Example 3 of the present invention.

It is well shown that the maximum temperature of fuel is 266° C. and this type is also suitable for fuel rod.

The multi-core monolithic fuel in accordance with the present invention has a smaller reaction surface area and lower maximum temperature of reaction surface than those of dispersion fuel having the same uranium density, and thereby may be used as a more stable fuel rod, because the reaction between U-Mo fuel and Al may be restrained. Additionally, the multi-core monolithic fuel in accordance with the present invention is expected to effectively restrain the formation of UAl$_x$ reaction layer, which reduces the performance of U-Mo fuel.

The multi-core fuel rod for research reactor in accordance with the present invention provides a structure having minimized contact surface area between nuclear fuel and aluminum, and thereby prevents excessive reaction between the fuel and aluminum, and reduces the formation of pores and swelling by restraining formation of reaction layer. Additionally, the multi-core fuel rod in accordance with the present invention has a high thermal conductivity, so that heat inside the fuel rod can be efficiently dissipated. Therefore, stability and performance of nuclear fuel may be improved by avoiding the problem that the stability of fuel rod is lowered due to temperature rise in the conventional fuel rod.

Furthermore, the uranium density of multi-core fuel is high compared to the conventional dispersion fuel, and may be applicable to a high-performance research reactor, which requires a high uranium density.

What is claimed is:

1. A fuel rod comprising a plurality of monolithic fuel cores disposed in an aluminum matrix, wherein each of the monolithic fuel cores contains uranium and molybdenum in a specific ratio and a uranium density of each of the plurality of monolithic fuel cores is above 10 gU/cc, and the diameter of each of the plurality of monolithic fuel cores is between 1.0 to 3.0 mm.

2. The fuel rod of claim 1, wherein the number of monolithic fuel cores is between 2 to 10.

3. The fuel rod of claim 1, wherein the molybdenum content of each of the plurality of monolithic fuel cores is between 6 to 10 wt % of the uranium content.

* * * * *